(12) United States Patent
Shimada

(10) Patent No.: US 10,876,593 B2
(45) Date of Patent: Dec. 29, 2020

(54) VIBRATION DAMPING DEVICE

(71) Applicant: YAMASHITA RUBBER CO., LTD., Saitama (JP)

(72) Inventor: Hitoshi Shimada, Saitama (JP)

(73) Assignee: YAMASHITA RUBBER CO., LTD., Saitama (JP)

( * ) Notice: Subject to any disclaimer, the term of this patent is extended or adjusted under 35 U.S.C. 154(b) by 26 days.

(21) Appl. No.: 16/090,207

(22) PCT Filed: Mar. 22, 2017

(86) PCT No.: PCT/JP2017/011496
§ 371 (c)(1),
(2) Date: Sep. 28, 2018

(87) PCT Pub. No.: WO2017/170054
PCT Pub. Date: Oct. 5, 2017

(65) Prior Publication Data
US 2019/0113100 A1    Apr. 18, 2019

(30) Foreign Application Priority Data
Mar. 31, 2016    (JP) .................... 2016-072373

(51) Int. Cl.
*F16F 15/08*    (2006.01)
*B60K 5/12*    (2006.01)
(Continued)

(52) U.S. Cl.
CPC ............... *F16F 15/08* (2013.01); *B60K 5/12* (2013.01); *B60K 5/1225* (2013.01);
(Continued)

(58) Field of Classification Search
CPC .. F16F 13/08; F16F 13/10; F16F 13/14; F16F 13/24; F16F 13/26; F16F 13/105;
(Continued)

(56) References Cited

U.S. PATENT DOCUMENTS

2005/0242481 A1* 11/2005 Ihara ............... F16F 15/08
267/141
2006/0043656 A1* 3/2006 Shimizu ............ F16F 1/3849
267/140.11
(Continued)

FOREIGN PATENT DOCUMENTS

| JP | 3490113 | 1/2004 |
| JP | 2011237332 | 11/2011 |
| JP | 2011247332 | 12/2011 |

OTHER PUBLICATIONS

International Search Report for PCT/JP2017/011496, dated Jun. 20, 2017.

*Primary Examiner* — Robert A. Siconolfi
*Assistant Examiner* — San M Aung
(74) *Attorney, Agent, or Firm* — Steven M. Greenberg, Esq.; Shutts & Bowen LLP

(57) ABSTRACT

Provided is a vibration damping device that reduces parts cost and improves productivity. The vibration damping device includes: a mounting member (10) that is attached to a vibration source; a holder (20) that is attached to a vibration receiver; and an insulator (30) that connects the mounting member (10) with the holder (20), wherein the holder (20) has a base portion (21) to which an end of the insulator (30) is coupled and a stopper portion (22) that rises from the base portion (21), and the insulator (30) has a pair of rubber feet (31 a, 31 b) that faces each other at a distance, wherein the pair of rubber feet (31a, 31 b) defines a cavity (35) therebetween, and the base portion (21) has an opening (25) formed therein at a position corresponding to the cavity (35).

8 Claims, 10 Drawing Sheets

(51) Int. Cl.
*F16F 1/376* (2006.01)
*F16F 1/38* (2006.01)

(52) U.S. Cl.
CPC ............ *B60K 5/1291* (2013.01); *F16F 1/376* (2013.01); *F16F 1/3849* (2013.01)

(58) Field of Classification Search
CPC .. F16F 13/106; F16F 13/1409; F16F 13/1427; F16F 13/1463; F16F 3/10; F16F 1/387; F16F 1/3849; F16F 1/376; B60K 5/1225; B60K 5/1291; B60K 5/12
USPC .................. 267/140, 140.11, 140.13, 140.12
See application file for complete search history.

(56) References Cited

U.S. PATENT DOCUMENTS

| | | | |
|---|---|---|---|
| 2007/0018366 A1 | 1/2007 | Maeno et al. | |
| 2010/0059912 A1* | 3/2010 | Takakura | F16F 1/3849 267/140.12 |
| 2012/0267186 A1* | 10/2012 | Hermann | F16F 1/3849 180/382 |
| 2017/0067529 A1* | 3/2017 | Kojima | F16F 13/10 |

* cited by examiner

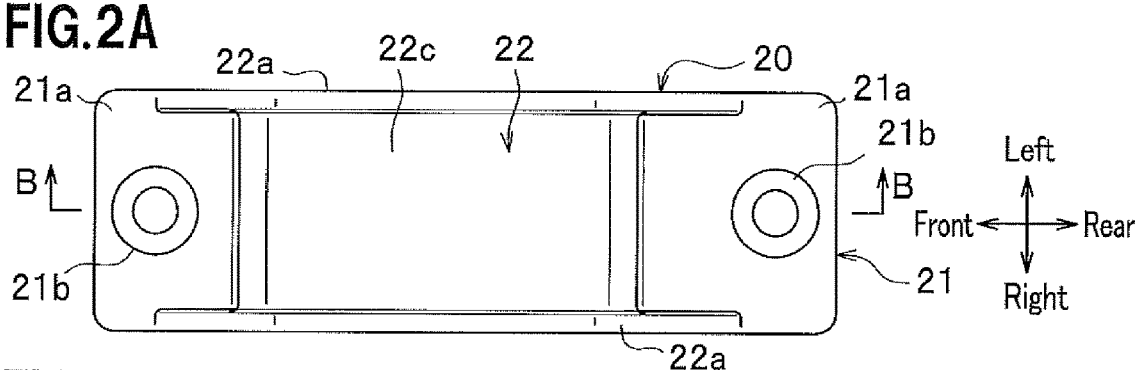
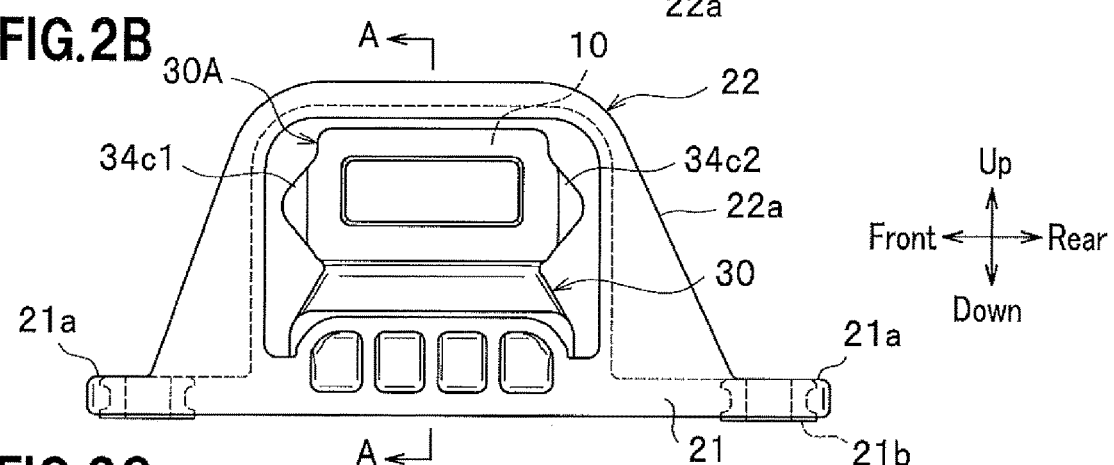
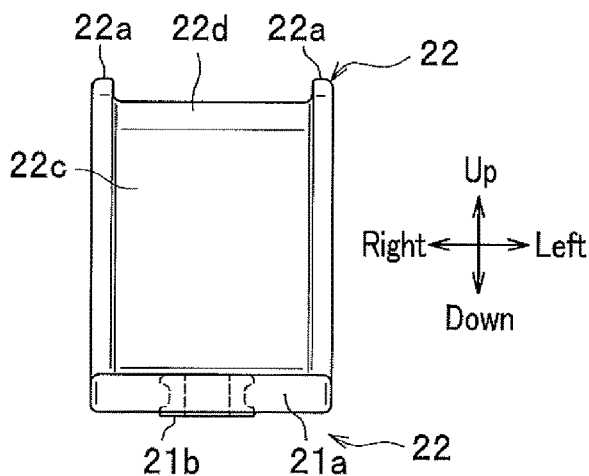
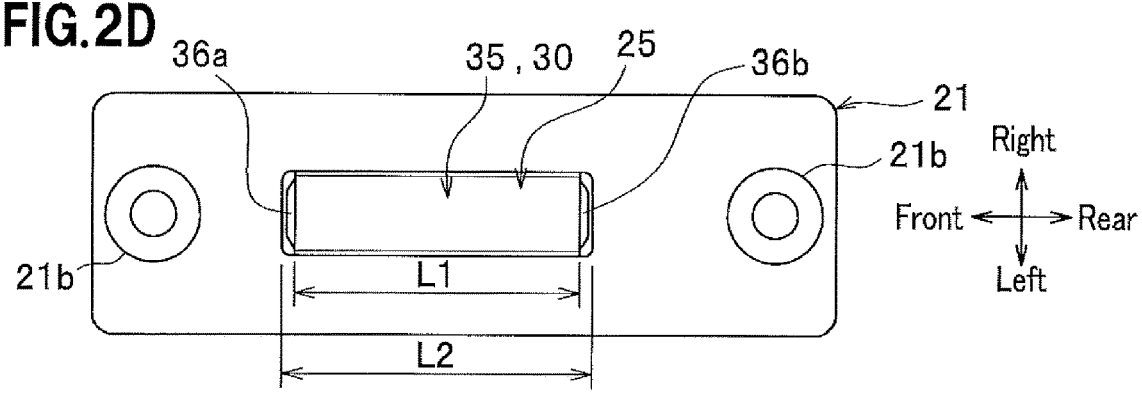

FIG.3
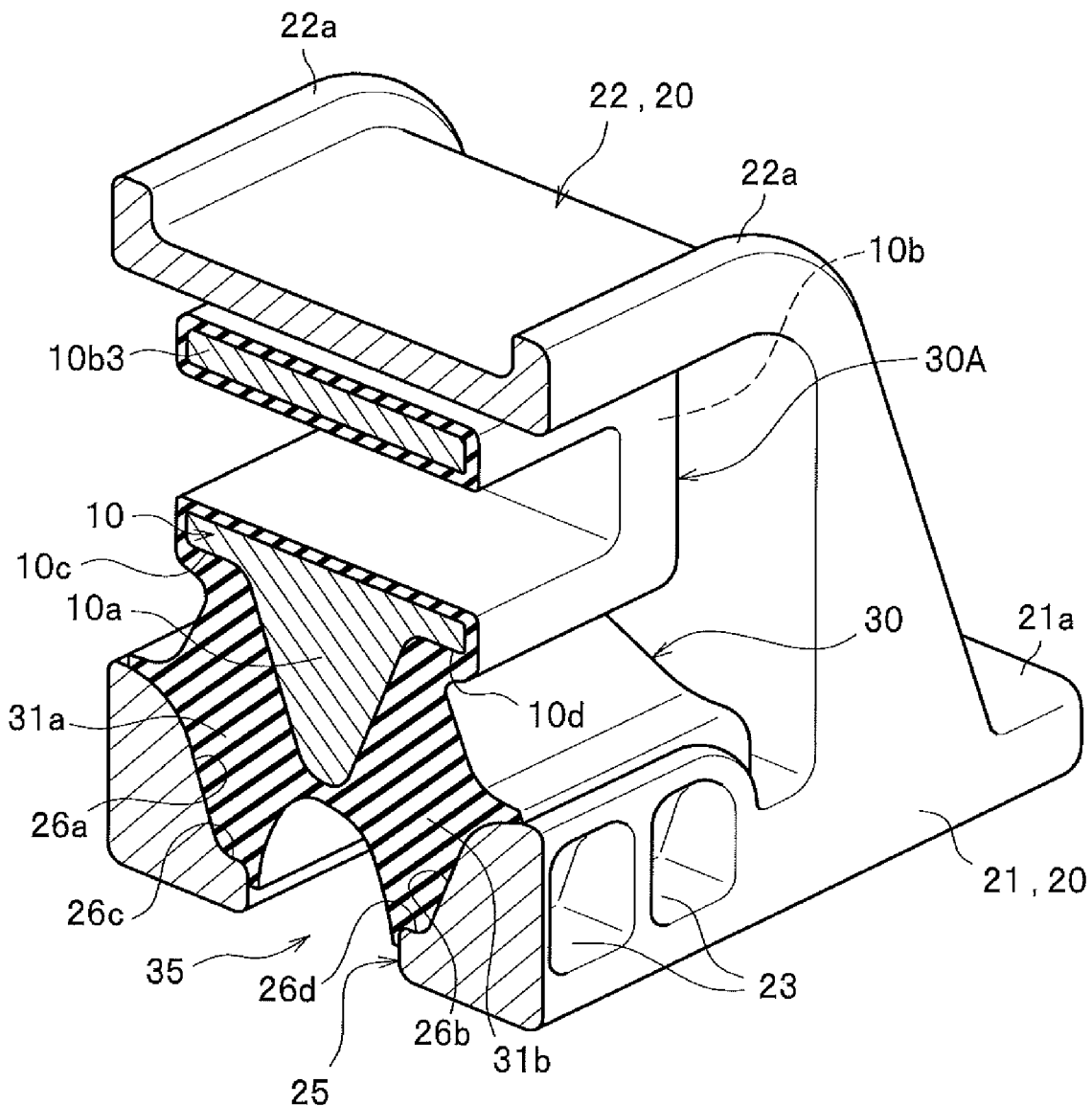
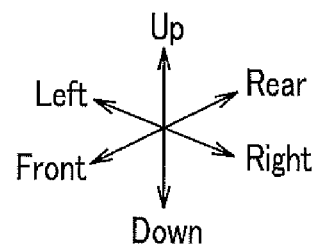

FIG.8
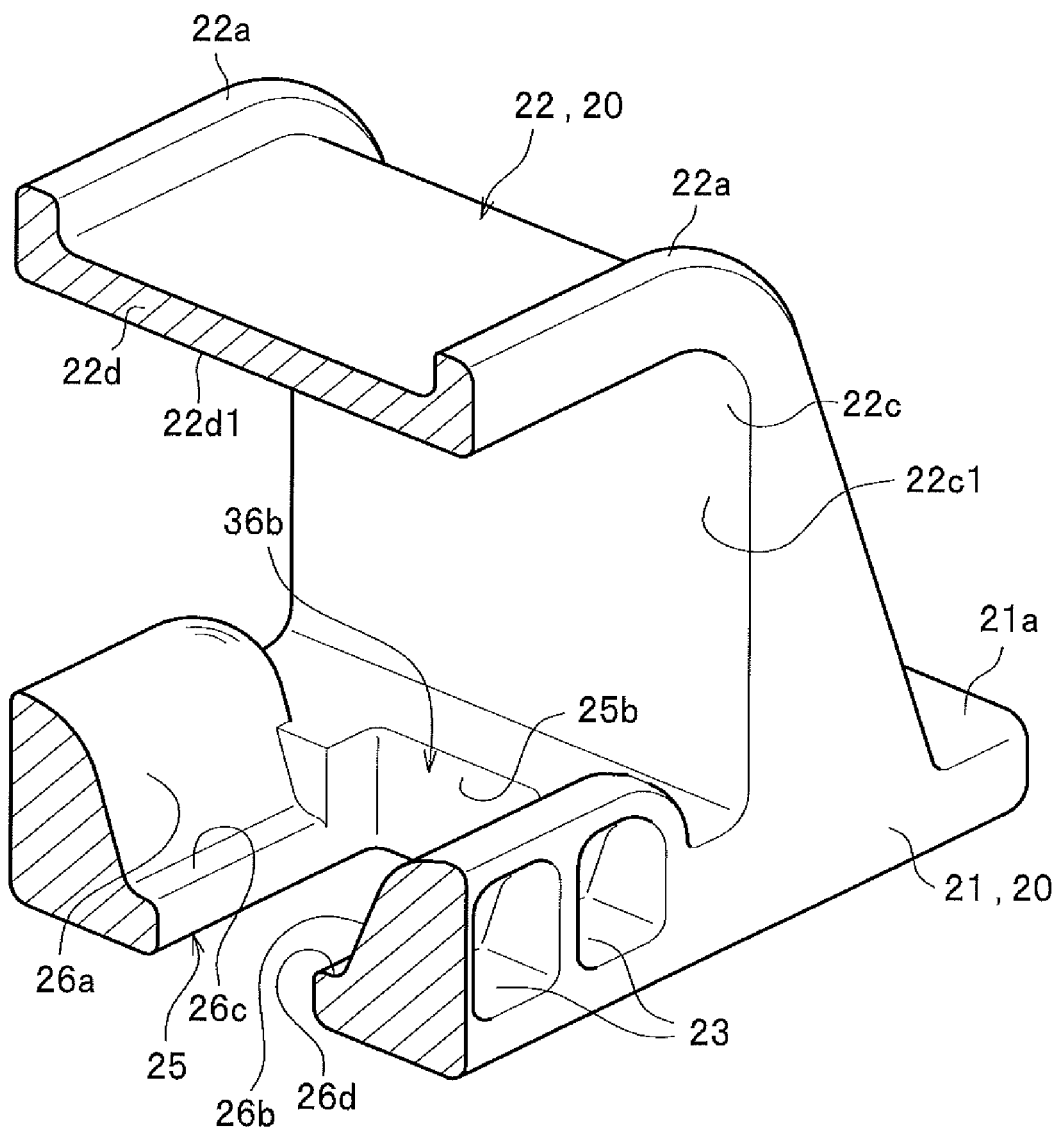
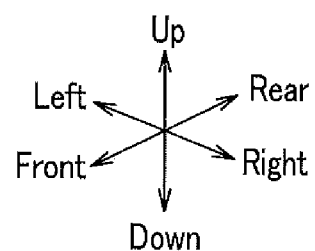

VIBRATION DAMPING DEVICE

CROSS-REFERENCE TO RELATED APPLICATION

This application is a U.S. National Stage Application under 35 U.S.C. § 371 of International Patent Application No. PCT/JP2017/011496 filed 22 Mar. 2017, which claims the benefit of priority to Japanese Patent Application No. 2016-072373 filed 31 Mar. 2016, the disclosures of all of which are hereby incorporated by reference in their entireties

TECHNICAL FIELD

The present invention relates to a vibration damping device for a vehicle.

BACKGROUND OF THE INVENTION

A vibration damping device as described in Japanese Patent Application Publication No. H07-19273 A has been well known as one in the same category as the present invention. This vibration damping device includes a holding body in a cylindrical shape that is attached to a vehicle body as a vibration receiver, an inner cylinder that is arranged inside the holding body and supports an engine as a vibration source, and a rubber-like elastic body that connects the holding body with the inner cylinder. Fixing parts for fixing the device to the vehicle body protrude frontward and rearward, respectively, from the holding body. In this vibration damping device, the spring ratio in the front-rear direction of the holding body is higher than that in the right-left direction of the same.

In contrast, a vibration damping device shown in FIGS. 9 to 11 has the spring ratio in the right-left direction of the vibration damping device made higher than that in the front-rear direction of the same. This vibration damping device includes, as shown in FIG. 9, a mounting member 60 that is attached to a vibration source, a holder 70 that is attached to a vibration receiver, and an insulator 80 that connects the mounting member 60 with the holder 70. The holder 70 includes, as shown in FIG. 10, a base part 71 in a plate shape to which a pair of rubber feet 81a, 81b of the insulator 80 are connected, a stopper part 72 in a gate shape that is attached to the upper surface of the base part 71. The base part 71 and the stopper part 72 are formed separately from each other. The pair of rubber feet 81a, 81b of the insulator 80 are fixed to a rising portions 73 of the base part 71. A cavity 82 extending in the front-rear direction is formed inside the pair of rubber feet 81a, 81b.

This vibration damping device includes the pair of rubber feet 81a, 81b flaring in the right-left direction, to effectively achieve a vibration damping function against vibration inputted in the right-left direction.

SUMMARY OF THE INVENTION

Problems to be Solved

In the vibration damping device shown in FIGS. 9 to 11, the insulator 80 is integrally formed with the mounting member 60 with respect to the base part 71, as shown in FIG. 11. At this time, slide molds (not shown) to be moved forward and backward, respectively, are used to form the cavity 82 of the insulator 80. This causes the stopper part 72 (see FIG. 9) to interfere with the slide molds in the directions of being moved, and therefore the stopper part 72 needs to be separated from the base part 71 (as a separate member). Therefore, the vibration damping device in FIGS. 9 to 11 has issues and problems of having high parts costs and requiring a man-hour for assembling the stopper part 72 to the base part 71.

The present invention has been made to solve the above-described problems, and is intended to provide a vibration damping device that reduces a parts cost and improves productivity.

Solution to Problem

A vibration damping device according to the present invention for solving such a problem includes: a mounting member that is attached to a vibration source; a holder that is attached to a vibration receiver; and an insulator that connects the mounting member with the holder. The holder includes a base portion to which an end of the insulator is coupled, and a stopper portion that rises from the base portion. The insulator has a pair of rubber feet that faces each other at a distance. The pair of rubber feet defines a cavity therebetween. The base portion has an opening formed therein that communicates with the cavity.

This vibration damping device allows a slide mold for forming the cavity of the insulator to be inserted through the opening of the base portion. That is, when the cavity is formed in the insulator, the stopper portion is integrally formed with the base portion, without using slide molds to be moved forward and rearward, respectively, as with the prior art. Forming the stopper portion integrally with the base portion no longer requires the holder being composed of two parts, and this leads to reduce the parts cost and reduce the man-hour for assembly.

In addition, a gap is defined between an inner surface of the opening and an end surface of the pair of rubber feet. The gap allows the insulator to be suitably deformed. This allows for reducing a spring force in the shearing direction of the insulator.

Further, a pair of bottom portions for supporting the pair of rubber feet is formed at an edge of the opening. This allows the pair of bottom portions to serve as a support portion for supporting the pair of rubber feet, to secure an appropriate spring force in the compression direction of the pair of rubber feet.

Furthermore, the opening is formed to be wider, in the shearing direction of the pair of rubber feet, than the pair of rubber feet. This allows the insulator to be suitably deformed to reduce the spring force in the shearing direction of the insulator.

Advantageous Effects of the Invention

The present invention provides a vibration damping device that reduces the parts cost and improves productivity. In addition, a gap is defined and an opening is formed to be wider than a pair of rubber feet, to reduce a spring force in the shearing direction of the insulator. Further, a pair of bottom portions is formed to secure an appropriate spring force in the compression direction of the pair of rubber feet.

BRIEF DESCRIPTION OF DRAWINGS

FIG. 2A is a plan view of the vibration damping device; FIG. 2B is a front view of the same; FIG. 2C is a bottom view of the same; FIG. 2D is a side view of the same;

FIG. 3 is a cross-sectional perspective view taken along a line A-A in FIG. 2B;

FIG. 8 is a perspective view of a holder alone along the line B-B in FIG. 2B;

EMBODIMENTS OF THE INVENTION

Hereinafter, a description will be given of embodiments of a vibration damping device according to the present invention, with reference to the drawings. Note that referring to "front-rear," "right-left," and "up-down" in the following description is based on directions shown in FIG. 1, and these may not always coincide with the front-rear direction, the right-left direction, and the up-down direction with respect to a vehicle body. The up-down direction and the right-left direction with respect to the vibration damping device are those in which vibration is mainly inputted.

Figure 1:
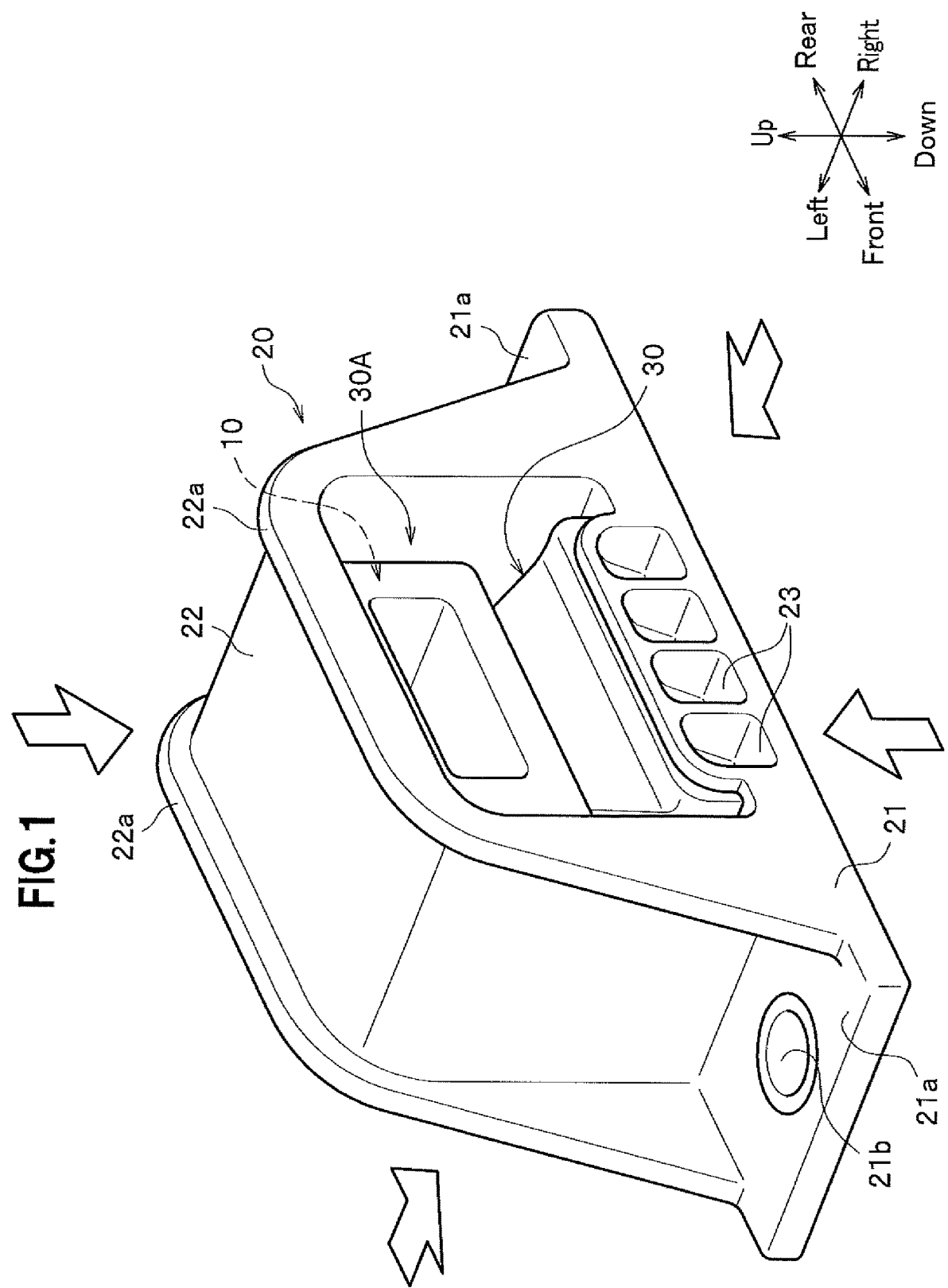
FIG. 1 is a perspective view of a vibration damping device according to an embodiment of the present invention.

A vibration damping device is a rubber vibration damping device arranged between a vibration source and a non vibration source (vibration receiver). As shown in FIG. 1, the vibration damping device includes a mounting member 10, a holder 20, and an insulator 30 that elastically connects the mounting member 10 with the holder 20. The mounting member 10 is attached to a part for an engine (not shown) as a vibration source, for example. The holder 20 is attached to a part for a vehicle body (not shown) as a vibration receiver.

Figure 4:
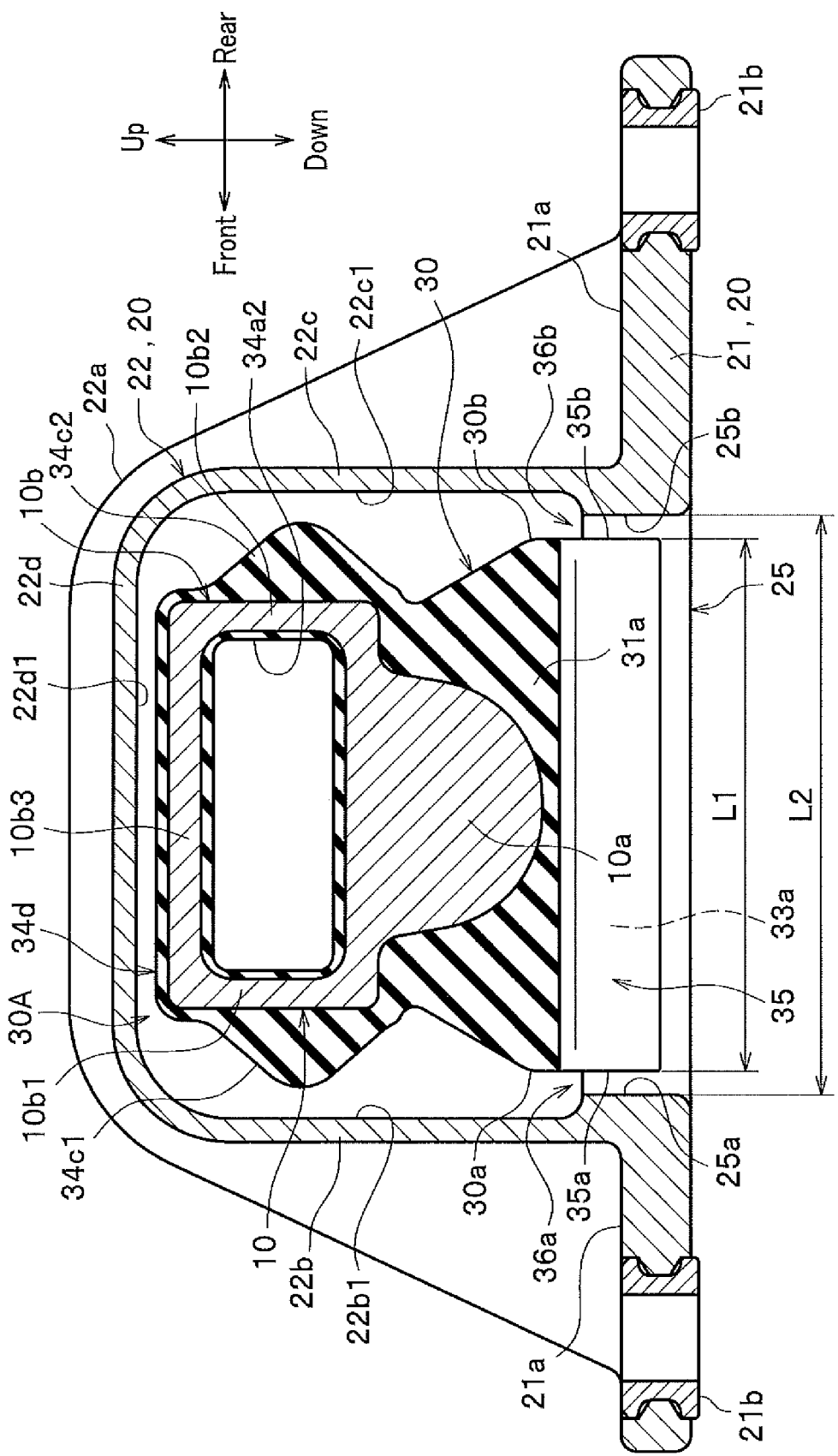
FIG. 4 is a cross-sectional perspective view taken along a line B-B in FIG. 2A.

The mounting member 10 is integrally provided on the insulator 30, as shown in FIGS. 1, 2B, and 4. The mounting member 10 is entirely embedded in the insulator 30 and vulcanization-bonded to the insulator 30, as shown in FIG. 4. The mounting member 10 is made of an aluminum alloy, for example. Note that the mounting member 10 may partly be exposed from the insulator 30.

The mounting member 10 includes a base portion 10$a$ and a frame portion 10$b$ rising from the base portion 10$a$, as shown in FIG. 4. The mounting member 10 has a holding space surrounded by the base portion 10$a$ and the frame portion 10$b$. A bracket (not shown) for the engine is inserted into the holding space. The frame portion 10$b$ includes a front frame 10$b$1, a rear frame 10$b$2, and an upper frame 10$b$3. The mounting member 10 is integrally formed with the insulator 30. The insulator 30 is vulcanization-bonded to the surface of the mounting member 10.

The upper surface of the upper frame 10$b$3 is covered with a rebound stopper 34$d$. The rebound stopper 34$d$ is integrally formed with the insulator 30 and vulcanization-bonded to the upper surface of the upper frame 10$b$3. The rebound stopper 34$d$ faces an inner surface 22$d$1 of an upper wall 22$d$ of a stopper portion 22 of the holder 20 at a predetermined distance.

The front surface of the front frame 10$b$1 of the frame portion 10$b$ is covered with a stopper portion 34$c$1. The stopper portion 34$c$1 protrudes forward from the front surface of the front frame 10$b$1. The rear surface of the rear frame 10$b$2 of the frame portion 10$b$ is covered with a stopper portion 34$c$2. The stopper portion 34$c$2 protrudes rearward from the rear surface of the rear frame 10$b$2. The stopper portions 34$c$1, 34$c$2 are integrally formed with the insulator 30 and vulcanization-bonded to the front frame 10$b$1 and the rear frame 10$b$2, respectively. Note that at least a part of the rebound stopper 34$d$ and stopper portions 34$c$1, 34$c$2 may be formed of a known elastic material different from the insulator 30.

When the mounting member 10 rebounds, if the rebound stopper 34$d$ abuts against the inner surface 22$d$1 of the upper wall 22$d$ of the stopper portion 22, the upward displacement of the mounting member 10 is restricted to reduce impact. In addition, if the stopper portion 34$c$1 abuts against the inner surface 22$b$1 of the front wall 22$b$ of the stopper portion 22, the forward displacement of the mounting member 10 is restricted to reduce impact. Likewise, if the stopper portion 34$c$2 abuts against the inner surface 22$c$1 of the rear wall 22$c$ of the stopper portion 22, the rearward displacement of the mounting member 10 is restricted to reduce impact.

The insulator 30 includes a pair of rubber feet 31$a$, 31$b$ facing each other in the right-left direction at a distance, as shown in FIG. 3. The lower end of the left rubber foot 31$a$ is vulcanization-bonded to an inclined portion 26$a$ on the left side and a bottom portion 26$c$ continuous to the inclined portion 26$a$, which are provided in a base portion 21 of the holder 20. The lower end of the right rubber foot 31$b$ is vulcanization-bonded to an inclined portion 26$b$ on the right side and a bottom portion 26$d$, which are provided in the base portion 21. A cavity 35 is formed between the pair of right and left rubber feet 31$b$, 31$a$ (forked portion) (see FIG. 5). The cavity 35 is a half-cylindrical space with its lower side opened. The cavity 35 has a cross section in the right-left direction that is formed to be curved and concave upward. The cavity 35 is formed in the lower portion of the insulator 30 all over in the front-rear direction, as shown in FIG. 4. The cavity 35 communicates with an opening 25 provided in the base portion 21.

The holder 20 includes the base portion 21 and the stopper portion 22 rising from the base portion 21. The base portion 21 and the stopper portion 22 are integrally formed of a resin material. The base portion 21 is formed in a substantially rectangular flat-plate shape in plan view. The base portion 21 is formed narrow in the right-left direction and elongated in the front-rear direction. Flange portions 21$a$ are formed at the front and the rear of the base portion 21. Collars 21$b$ are attached to the flange portions 21$a$. A fixing bolt (not shown) is inserted through the collar 21$b$ for fixing it to the frame or the like of the vehicle body.

An opening 25 is formed in the center of the base portion 21 at a position corresponding to the cavity 35, as shown in FIG. 2D. The opening 25 communicates with the cavity 35 of the insulator 30, and is formed in a substantially rectangular shape in the front-rear direction. The opening width L2 in the front-rear direction of the opening 25 is larger than the opening width L1 in the front-rear direction of the cavity 35 (L2>L1), as shown in FIG. 4. In other words, the opening 25 is formed wider in the direction in which the pair of rubber feet 31$a$, 31$b$ are arranged (i.e., in the right-left direction), in the direction orthogonal to the compression direction (i.e., in the front-rear direction), and in the shearing direction, than the pair of rubber feet 31a, 31b, that is, wider than the opening of the cavity 35. Note that the lower ends of the pair of rubber feet 31a and 31 b respectively enter in the opening 25, as shown in FIG. 3.

Figure 6:
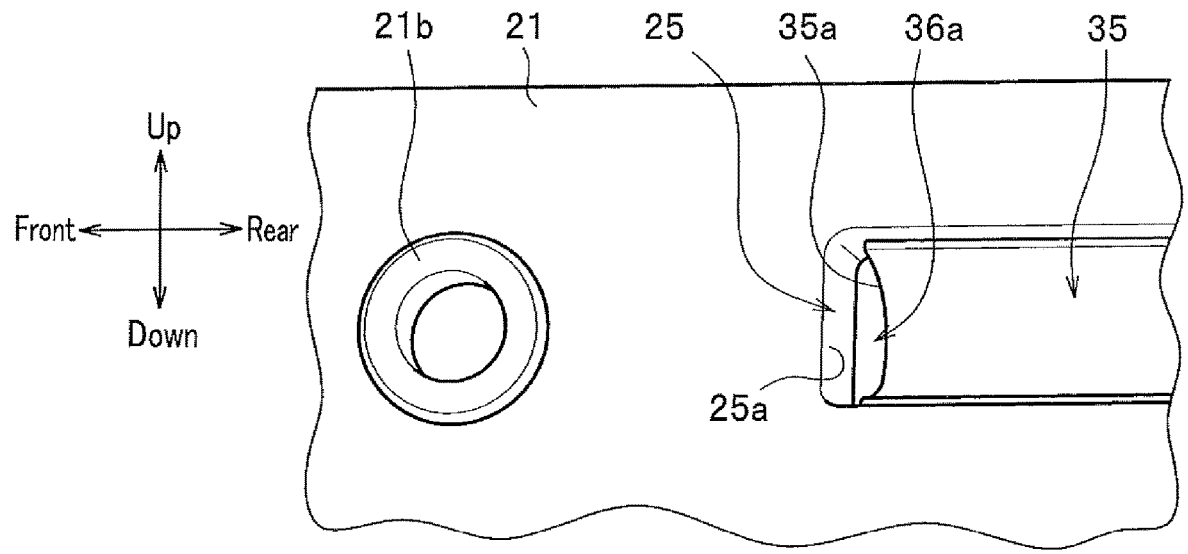
FIG. 6 is a perspective view of a cavity as viewed through an opening.

Due to the difference between the opening widths L2 and L1, a gap 36a is defined, as shown in FIG. 4, between a front end surface 25a, which is an inner surface of the opening 25, and a front end surface 35a, which is an end surface of the pair of rubber feet 31a, 31 b as the insulator 30 (see FIG. 6). Accordingly, the front end surface 35a of the pair of rubber feet 31a, 31b is separated from the front end surface 25a of the opening 25. Likewise, a front shoulder 30a of the insulator 30 is separated from the inner surface 22b1 of the front wall 22b of the stopper portion 22.

Similarly, a gap portion 36b is defined between a rear end surface 25b, which is an inner surface of the opening 25, and a rear end surface 35b, which is an end surface of the pair of rubber feet 31a, 31 b as the insulator 30. Accordingly, the rear end surface 35b of the pair of rubber feet 31a, 31 b is separated from the rear end surface 25b of the opening 25. Likewise, a rear shoulder 30b of the insulator 30 is separated from the inner surface 22c1 of the rear wall 22c of the stopper portion 22.

Providing the gaps 36a, 36b allows the insulator 30 to be deformed in the front-rear direction due to a shearing force.

The base portion 21 has the inclined portions 26a, 26b formed so as to be continuous to the opening 25, as shown in FIG. 8. Specifically, the inclined portion 26a is formed so as to be continuous to, and rise obliquely leftward and upward from, the bottom portion 26c formed at an edge of the opening 25. Likewise, the inclined portion 26b is formed so as to be continuous to, and rise obliquely rightward and upward from, the bottom portion 26d formed at an edge of the opening 25. Here, the bottom portion 26c vertically faces a left flange portion 10c of the mounting member 10, as shown in FIG. 3. Likewise, the bottom portion 26d vertically faces a right flange portion 10d of the mounting member 10. That is, a downward load applied to the mounting member 10 is supported by the bottom portions 26c, 26d of the base portion 21 via the pair of rubber feet 31a, 31b. The inclined portions 26a, 26b are each formed to have cutout portions 23 (only those formed in the inclined portion 26b are shown).

The stopper portion 22 is formed in a gate shape to cover the insulator 30 (and the mounting member 10). The stopper portion 22 includes the front wall 22b, the rear wall 22c, and the upper wall 22d continuous to the front wall 22b and the rear wall 22c. The inner surface 22b1 of the front wall 22b faces the stopper portion 34c1 and the inner surface 22c1 of the rear wall 22c faces the stopper portion 34c2. The inner surface 22d1 of the upper wall 22d faces the rebound stopper 34d. The stopper portion 22 has outer ribs 22a formed on its outer surface. The outer ribs 22a increase strength of the stopper portion 22.

Next, a description will be given of a method of manufacturing the vibration damping device. The method of manufacturing the vibration damping device includes a step of forming an insulator assembly and a step of forming a holder.

Figure 5:
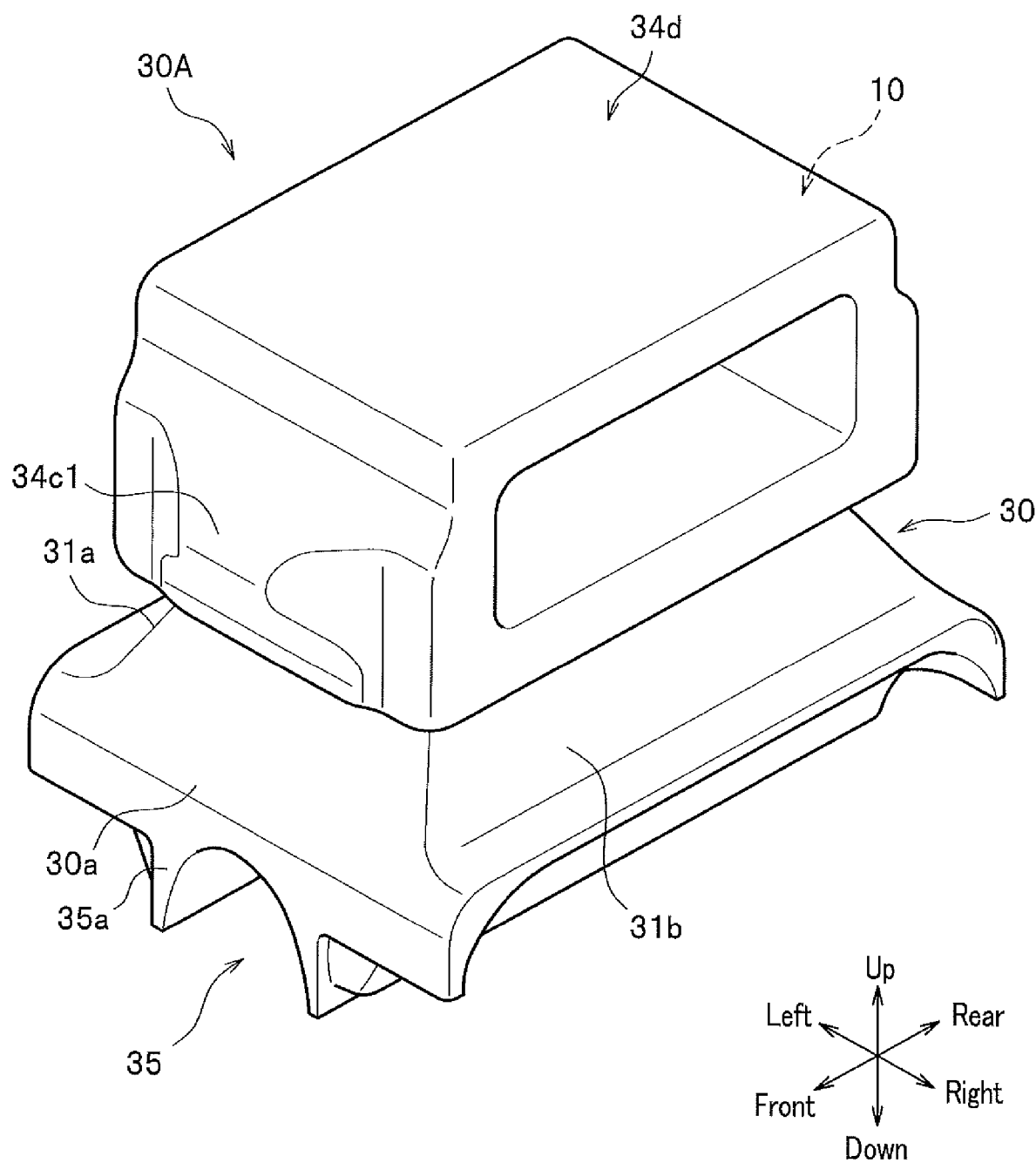
FIG. 5 is a perspective view of an insulator assembly.

The step of forming an insulator assembly is a step of forming an insulator assembly 30A shown in FIG. 5. At first in this step, the mounting member 10 is placed in a mold (not shown). Then, an unvulcanized rubber material is injected into the mold to vulcanize it by a predetermined vulcanizing device (not shown), which has conventionally been used. In this way, the insulator assembly 30A having the mounting member 10 embedded therein is produced. Note that the vulcanization adhesion is executed in a heated environment, and therefore the insulator assembly 30A is cooled to a room temperature after being produced.

Upon the insulator assembly 30A being cooled, the step of forming a holder is executed. The step of forming a holder is a step of integrally molding the holder 20 in the insulator assembly 30A. In this step, the insulator assembly 30A is placed in a mold (not shown). Then, a resin material is injected into the mold to integrally mold the holder 20 with the insulator assembly 30A. As shown by outlined arrows in FIG. 1, the mold includes an upper mold and a lower mold that are moved from above and from below, respectively, toward the insulator assembly 30A, and a right mold and a left mold that are moved from the right and from the left, respectively, toward the insulator assembly 30A.

Figure 7:
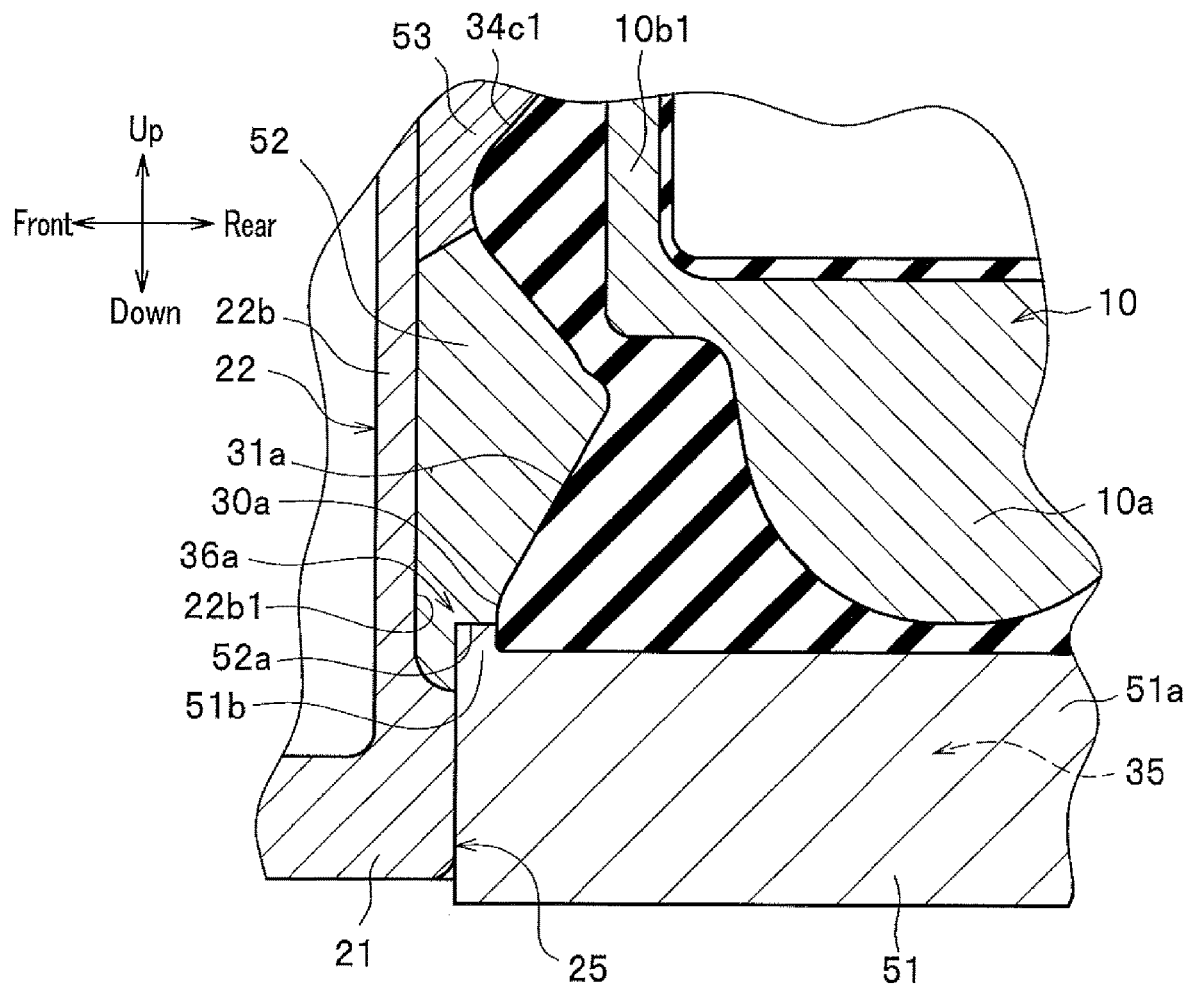
FIG. 7 is an enlarged sectional view to indicate a mold parting position.
Figure 9:
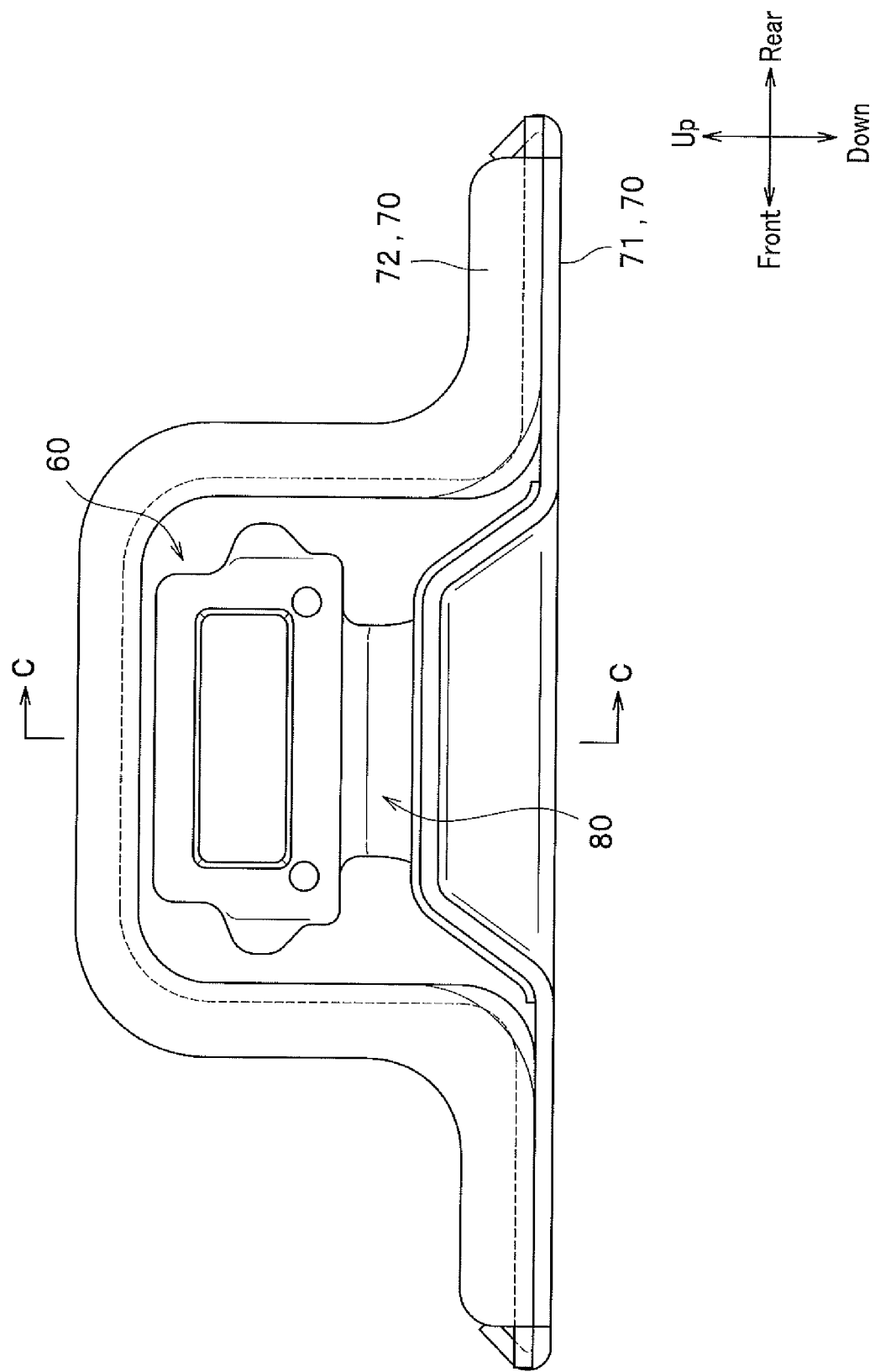
FIG. 9 is a front view of a vibration damping device in the prior art.
Figure 10:
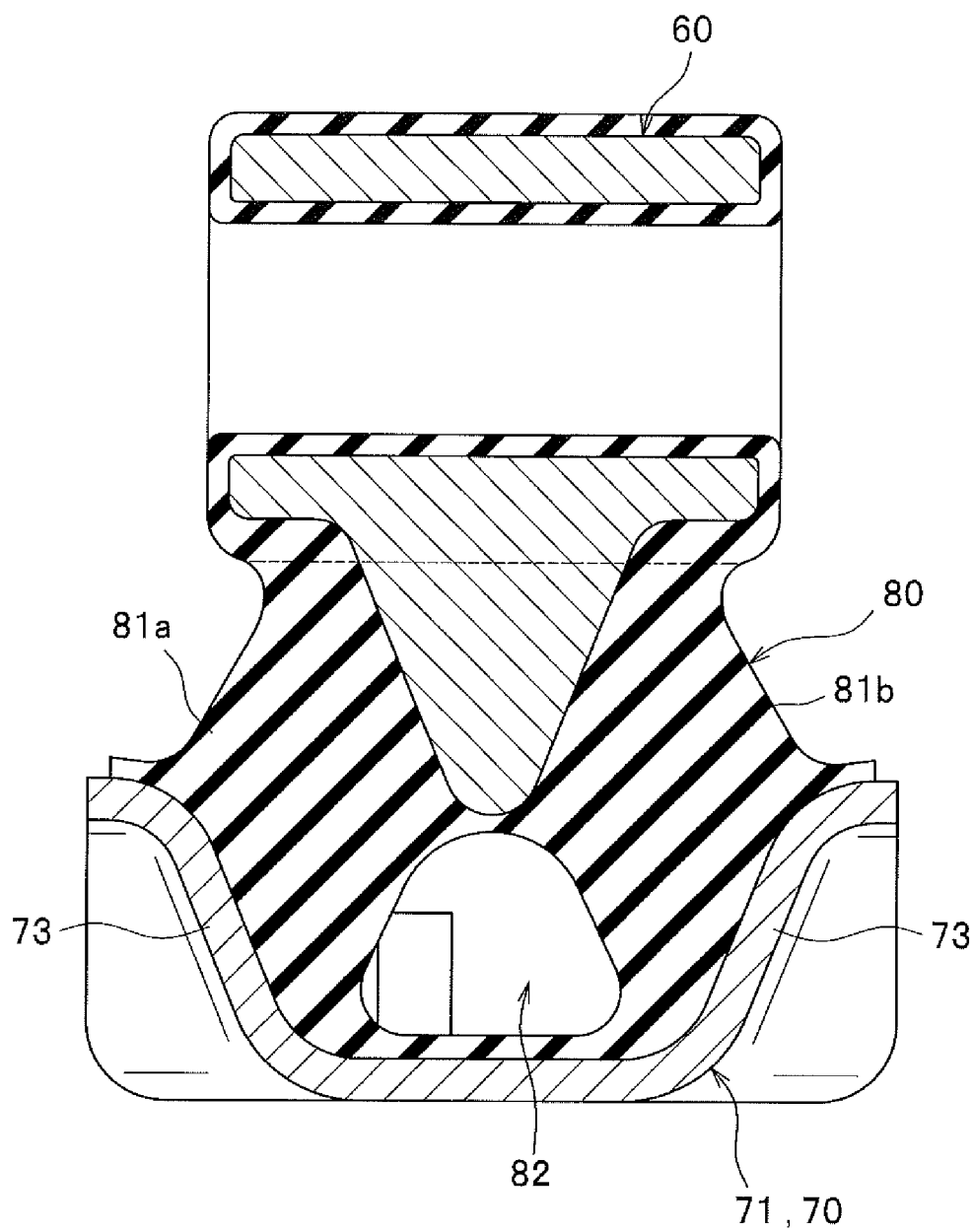
FIG. 10 is a diagram showing the vibration damping device in the prior art, in a cross-sectional view taken along a line C-C in FIG. 9.
Figure 11A:
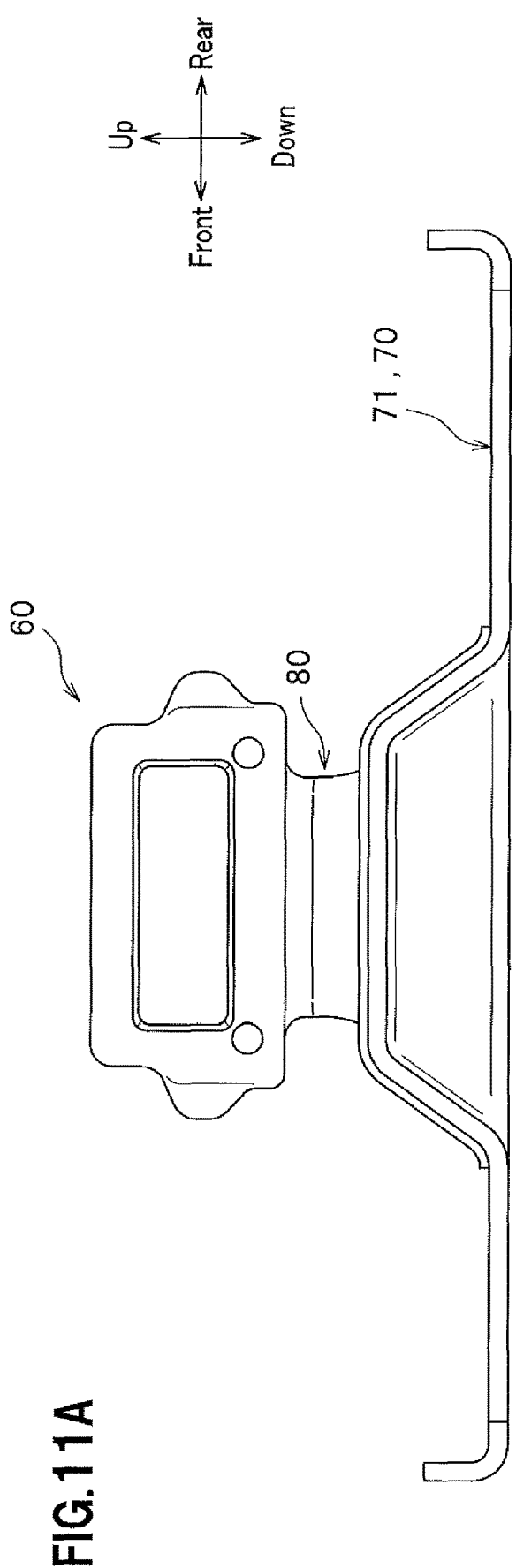
FIG. 11A is a front view of the vibration damping device in the prior art to show that an insulator and a mounting member are formed on a base portion.
Figure 11B:
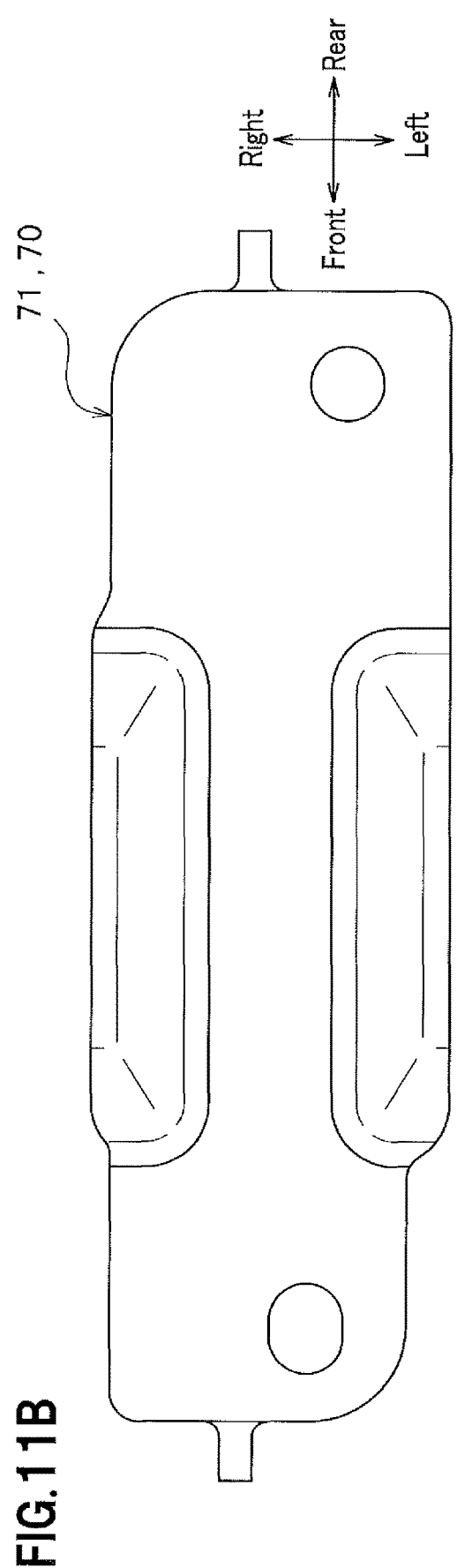
FIG. 11B is a bottom view of the same.

As shown in FIG. 7, a lower mold 51 includes an inserted portion 51a that is to be inserted into the cavity 35 of the insulator assembly 30A and disposed therein, and a protruding portion 51b that is to be inserted and disposed beside the front shoulder portion 30a of the insulator assembly 30A. The inserted portion 51a prevents the resin material from entering into the cavity 35 and is inserted into the cavity 35 of the insulator assembly 30A. This causes the cavity 35 to be suitably secured at the time of the holder 20 being molded.

The protruding portion 51b of the lower mold 51 defines the gap 36a (see FIG. 4) in front of the cavity 35, and is disposed beside the front shoulder portion 30a of the insulator assembly 30A. Note that the protruding portion 51b of the lower mold 51 is also disposed beside the rear shoulder portion 30b of the insulator assembly 30A, even though not shown. This causes the gap 36b (see FIG. 4) to be defined at the rear end of the cavity 35.

The protruding portion 51b of the lower mold 51 is fitted to a lower end stepped portion 52a of a left mold 52. Note that reference numeral 53 in FIG. 7 indicates a right mold. This example shows that the right mold 53 is arranged on the left mold 52 at the time of mold clamping, but the present invention is not limited thereto and the left mold 52 may be arranged on the right mold 53.

According to the vibration damping device of the present embodiment as described above, a slide mold (lower mold) for forming the cavity 35 of the insulator 30 is inserted through the opening 25 of the base portion 21. That is, at the time of the cavity 35 being formed in the insulator 30, the stopper portion 22 can be integrally formed with the base portion 21, without using slide molds to be moved forward and rearward, respectively. Forming the stopper portion 22 integrally with the base portion 21 no longer requires the holder 20 being composed of two parts, and this leads to reduce the parts cost and reduce the man-hour for assembly.

In addition, the gaps 36a, 36b are defined between the inner surface of the opening 25 and the end surfaces of the pair of rubber feet 31a, 31 b, and then the insulator 30 can be suitably deformed. This reduces a spring force in the shearing direction (front-rear direction) of the insulator 30.

Further, the pair of bottom portions 26c, 26d for supporting the pair of rubber feet 31a, 31 b are formed at the edge of the opening 25. This causes the pair of bottom portions 26c, 26d to serve as a support portion to support the pair of rubber feet 31a, 31 b, to secure an appropriate spring force in the compression direction (downward direction) of the pair of rubber feet 31a, 31 b.

Furthermore, the opening 25 is formed wider, in the shearing direction of the pair of rubber feet 31a, 31b, than the pair of rubber feet 31a, 31b. This allows the insulator 30 to be suitably deformed to reduce the spring force in the shearing direction of the insulator 30.

Hereinabove, a description has been given of the embodiments of the present invention, but the present invention is not limited to the above-described embodiments and various modifications are possible. For example, the pair of rubber feet 31*a*, 31*b* of the insulator 30 are arranged in the right-left direction, but the configuration of the present invention can also be adopted in a vibration damping device having the pair of rubber feet arranged in the front-rear direction. Also in this case, the slide mold (inserted portion 51*a* of the lower mold 51) can be inserted into the cavity 35 to be formed inside the pair of rubber feet 31*a*, 31*b* through a portion as the opening 25. Therefore, using slide molds to be moved forward and rearward, respectively, as with the prior art is no longer required, and the stopper portion 22 can be formed integrally with the base portion 21.

In addition, the gap 36*a*, 36*b* may not always be provided to cause the front end surface 35*a* and rear end surface 35*b* of the pair of rubber feet 31*a*, 31*b* to contact the holder 20. In this case, the front shoulder portion 30*a* of the insulator 30 may be separated from the inner surface 22*b*1 of the front wall 22*b* of the stopper portion 22, and the rear shoulder portion 30*b* may be separated from the inner surface 22*c*1 of the rear wall 22*c*. This separation allows the insulator 30 to be deformed in the shearing direction (front-rear direction) thereof.

Further, the holder 20 has a rectangular shape in the front-rear direction, but is not limited thereto and may have a rectangular shape in the right-left direction. Alternatively, the holder 20 may have a square shape in plan view.

The invention claimed is:

1. A vibration damping device comprising:
a mounting member that is attached to a vibration source;
a holder that is attached to a vibration receiver; and
an insulator that connects the mounting member with the holder,
wherein
the mounting member, the holder, and the insulator are substantially integrated with one another,
the holder includes: a base portion to which an end of the insulator is coupled; and a stopper portion that rises from the base portion, and
the insulator has a pair of rubber feet that faces each other, only in a direction orthogonal to one direction in which the base portion extends, at a distance,
wherein
the pair of rubber feet defines a cavity therebetween,
the cavity is formed in a lower portion of the insulator all over in said one direction,
the base portion has an opening, communicating with the cavity, formed therein at a position corresponding to the cavity, and
the opening is formed wider, in said one direction and the direction orthogonal to said one direction, than the cavity.

2. The vibration damping device according to claim 1, wherein a gap is defined between an inner surface of the opening and an end surface of the pair of rubber feet.

3. The vibration damping device according to claim 1, wherein a pair of bottom portions for supporting the pair of rubber feet is formed at an edge of the opening.

4. The vibration damping device according to claim 1, wherein the opening is formed to be wider, in the shearing direction of the pair of rubber feet, than the pair of rubber feet.

5. The vibration damping device according to claim 2, wherein a pair of bottom portions for supporting the pair of rubber feet is formed at an edge of the opening.

6. The vibration damping device according to claim 2, wherein the opening is formed to be wider, in the shearing direction of the pair of rubber feet, than the pair of rubber feet.

7. The vibration damping device according to claim 3, wherein the opening is formed to be wider, in the shearing direction of the pair of rubber feet, than the pair of rubber feet.

8. The vibration damping device according to claim 5, wherein the opening is formed to be wider, in the shearing direction of the pair of rubber feet, than the pair of rubber feet.

* * * * *